United States Patent
Granzow et al.

(10) Patent No.: US 7,212,823 B2
(45) Date of Patent: May 1, 2007

(54) METHOD FOR ESTABLISHING A RADIO CHANNEL IN A WIRELESS CDMA NETWORK WHEREIN THE PREAMBLE SIGNAL INCREASES IN POWER DURING TRANSMISSION

(75) Inventors: Wolfgang Granzow, Heroldsberg (DE); Georg Frank, Nürnberg (DE); Dirk Gerstenberger, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/496,074

(22) PCT Filed: Nov. 13, 2002

(86) PCT No.: PCT/EP02/12715

§ 371 (c)(1),
(2), (4) Date: Dec. 17, 2004

(87) PCT Pub. No.: WO03/044985

PCT Pub. Date: May 30, 2003

(65) Prior Publication Data

US 2005/0221833 A1   Oct. 6, 2005

(30) Foreign Application Priority Data

Nov. 20, 2001  (GB) ................ 0127859.7

(51) Int. Cl.
*H04Q 7/20*  (2006.01)
(52) U.S. Cl. ............... 455/450; 455/509; 455/522; 370/335
(58) Field of Classification Search ........... 455/522, 455/69; 370/335, 437, 252
See application file for complete search history.

(56) References Cited

U.S. PATENT DOCUMENTS

| | | | |
|---|---|---|---|
| 5,809,017 A | 9/1998 | Smith et al. | |
| 6,519,461 B1 | 2/2003 | Andersson et al. | |
| 6,650,905 B1 * | 11/2003 | Toskala et al. | 455/522 |
| 2002/0010001 A1 * | 1/2002 | Dahlman et al. | 455/522 |
| 2003/0012217 A1 * | 1/2003 | Andersson et al. | 370/437 |
| 2003/0134655 A1 * | 7/2003 | Chen et al. | 455/522 |
| 2003/0193915 A1 * | 10/2003 | Lee et al. | 370/335 |

FOREIGN PATENT DOCUMENTS

| | | |
|---|---|---|
| WO | WO 0008908 | 2/2000 |
| WO | WO 0025443 | 5/2000 |
| WO | WO 0131950 | 5/2001 |

* cited by examiner

OTHER PUBLICATIONS

Schulist et al., "Link level performance results for a WCDMA random access scheme with preamble power ramping and fast acquisition indication", Gateway to 21$^{st}$ Century Communications Village. VTC 1999-Fall, IEEE VTS 50$^{th}$ Vehicular Technology Conference (Cat. No. 99CH36324), Amsterdam, pp. 2581-2585, vol. 5, XP002234741.

*Primary Examiner*—Joseph Feild
*Assistant Examiner*—Phuoc Doan
(74) *Attorney, Agent, or Firm*—Michael Cameron, Esq.

(57) ABSTRACT

In a synchronization scheme, for example for establishing a channel in a UMTS radio communication system, when a user device (or user equipment, UE) such as a mobile terminal is establishing a channel with a network, the user device transmits signals on the uplink DPCCH, and the power of these signals is ramped up from a calculated initial power level until the transmission is detected by the receiver, i.e. until the receiver has obtained synchronization to the uplink signal.

10 Claims, 6 Drawing Sheets

METHOD FOR ESTABLISHING A RADIO CHANNEL IN A WIRELESS CDMA NETWORK WHEREIN THE PREAMBLE SIGNAL INCREASES IN POWER DURING TRANSMISSION

TECHNICAL FIELD OF THE INVENTION

This invention relates to a method of establishing a radio communication channel, in particular between a mobile station and a network.

BACKGROUND OF THE INVENTION

A major challenge in mobile communication systems is to perform efficient data transmission at low terminal power consumption. Packet data transmission services in particular are characterized by extreme burstiness of the traffic volume that needs to be transferred over the radio interface with one user. Time intervals where large amounts of traffic need to be transmitted alternate with time intervals where there is only a very low volume traffic or no traffic at all.

This is relevant in the case of UMTS, and the invention will be described with reference to its use in a Wideband Code Division Multiple Access (WCDMA) wireless network, although it will be appreciated that the same principle may be applied in other networks.

If the physical link between a terminal and the network is maintained continuously, even when no user data actually needs to be transmitted, this leads to continuous power consumption of the terminal. On the other hand, maintenance of the physical link guarantees that, if new data arises, it can be transferred instantly without additional delay.

Maintenance of a channel is therefore favored. There are two main approaches to enable power saving in the terminal in this case.

One possibility is to use channel type switching. In this case, low-volume traffic is transmitted and received on common channels, while high-volume traffic is transmitted on dedicated channels. A potential problem with this approach is the need to perform a new link synchronization before each transmission on a common channel, and whenever transmission on a dedicated channel needs to be started again.

A second possibility is to perform discontinuous transmission and reception on dedicated channels. This possibility has different possible variants. One variant is referred to as "DPCCH Discontinuous transmission and reception (DPCCH DTRX)".

The purpose of DPCCH DTRX is to switch transmission and reception on the Dedicated Physical Control Channel (DPCCH) off, into a "sleep mode" for a number of radio frames, in both the terminal and the network. At regular intervals, called Discontinuous Transmission periods ("DTX periods") transmitters and receivers shall wake up and perform re-synchronization of the physical link. After re-synchronization it is possible to transmit a short message in either direction, which for instance could be a command to leave the DPCCH DTRX mode and return to normal continuous transmission. This command could be either a Layer 1 indicator sent on the DPCCH or a higher layer message carried on the Dedicated Physical Data Channel (DPDCH).

In general in DPCCH DTRX, the spreading codes are kept assigned all the time in both the transmitter and the receiver. However, when the sleep periods are rather long it might be feasible to perform sharing of the codes among multiple users for which DPCCH DTRX is active.

To enable DPCCH DTRX to be used successfully, re-synchronization of the physical link must be performed quickly, and in a power efficient way.

SUMMARY OF THE INVENTION

According to this invention, there is provided a fast initial synchronization scheme, which can be employed for different purposes.

For example, when channel type switching is used, the synchronization scheme according to the invention can be used for fast Dedicated Channel (DCH) establishment, since the spreading codes of the dedicated channel to be set up are already assigned to the user equipment (UE) before the proposed procedure is started. In this way, the synchronization scheme according to the invention can be used for switching from a common channel to the dedicated channel.

As another example, when discontinuous DPCCH transmission/reception (DPCCH DTRX) is used, the synchronization scheme according to the invention can be used for fast re-synchronization of a dedicated physical link, in order to enable this technique to achieve terminal power saving.

As another example, the synchronization scheme according to the invention can also be used for fast inter-frequency handover.

More generally, the synchronization scheme according to the invention can be used in any context where it is useful to establish a channel (primarily though not necessarily a dedicated channel) quickly.

In the synchronization scheme according to the invention, when a user device (or user equipment, UE) such as a mobile terminal is establishing a channel with a network, the user device transmits signals on the uplink DPCCH, and the power of these signals is ramped up from a calculated initial power level until the transmission is detected by the receiver, i.e. until the receiver has obtained synchronization to the uplink signal. It is presumed that the receiver knows the spreading code used by the sender, and furthermore the receiver is aware that the sender is trying to establish a link within a well-defined time window. Furthermore, since a dedicated spreading code is employed, it is used by only a single transmitter. There is no contention and therefore no possibility for collisions due to the spreading code. This simplifies the detection task of the receiver.

A somewhat similar preamble power ramping procedure is used in the random access procedure on the random access channel. However, in that case, the receiver is not waiting for any transmission from a specific transmitter using a specific spreading code in a specific time window. Moreover, in the case of the random access procedure, multiple transmitters may be attempting to access the network at the same time, using the same spreading code.

Acquisition of the uplink signal is preferably indicated to the UE on the downlink DPCCH, for instance simply by sending power down polarity of the Transmit Power Control (TPC) bits. However, the network can indicate that acquisition has been achieved in other ways, for example by sending an explicit signal on the downlink control channel.

Since there exists no modulation on the DPCCH, equivalent with the signatures of the random access preambles, it is possible to obtain a very large processing gain at the receiver (e.g. equal to all 2560 chips of a slot, i.e. 34 dB).

This means that the scheme according to the present invention can achieve very power efficient, highly securedetection of the DPCCH transmission in the base station receiver.

According to a first aspect of the present invention, there is provided a method of establishing a channel between a communications device and a wireless network, the method comprising:

determining the channel which is to established;

transmitting a preamble signal from the communications device to the network on said channel, wherein the preamble signal increases in power during transmission;

in the network, attempting to detect the transmitted preamble signal on said channel; and in response to successful detection of the transmitted preamble signal, sending a power control signal from the network to the communications device.

According to a second aspect of the present invention, there is provided a method of establishing a channel between a communications device and a wireless CDMA network, the channel comprising an uplink channel from the communications device to the network and a downlink channel from the network to the communications device, the method comprising:

defining the uplink channel by means of a dedicated code;

transmitting a preamble signal from the communications device to the network on said uplink channel, wherein the preamble signal increases in power during transmission;

in the network, attempting to detect the transmitted preamble signal on said uplink channel; and in response to successful detection of the transmitted preamble signal, establishing the uplink channel and the downlink channel.

According to a third aspect of the present invention, there is provided a method of operating a wireless communication network, in which a communications device communicates with the network, the method comprising:

establishing a first common channel and a second dedicated channel for communication between a communications device and a wireless network, the second channel comprising a dedicated uplink channel and a dedicated downlink channel; and in order to switch transmissions from the first common channel to the second dedicated channel:

transmitting a preamble signal from the communications device to the network on said dedicated uplink channel, wherein the preamble signal increases in power during transmission;

in the network, attempting to detect the transmitted preamble signal on said dedicated uplink channel; and in response to successful detection of the transmitted preamble signal, establishing a connection on said second dedicated channel.

According to a fourth aspect of the present invention, there is provided a method of operating a wireless communication network, in which a communications device communicates with the network, the method comprising:

establishing a dedicated channel for communications between a communications device and a wireless network, wherein, in a first mode, data is transmitted continuously on said channel, and, in a second mode, transmission on said channel is discontinuous, and wherein, in said second mode, the method comprises:

transmitting a resynchronization signal from the communications device to the network on said channel, wherein the resynchronization signal increases in power during transmission;

in the network, attempting to detect the transmitted resynchronization signal on said channel; and after resynchronization of said dedicated channel, determining whether to return to said first mode.

According to further aspects of the present invention, there are provided network nodes and communication devices which operate in accordance with these aspects of the invention.

DETAILED DESCRIPTION OF PREFERRED EMBODIMENTS

Figure 1:
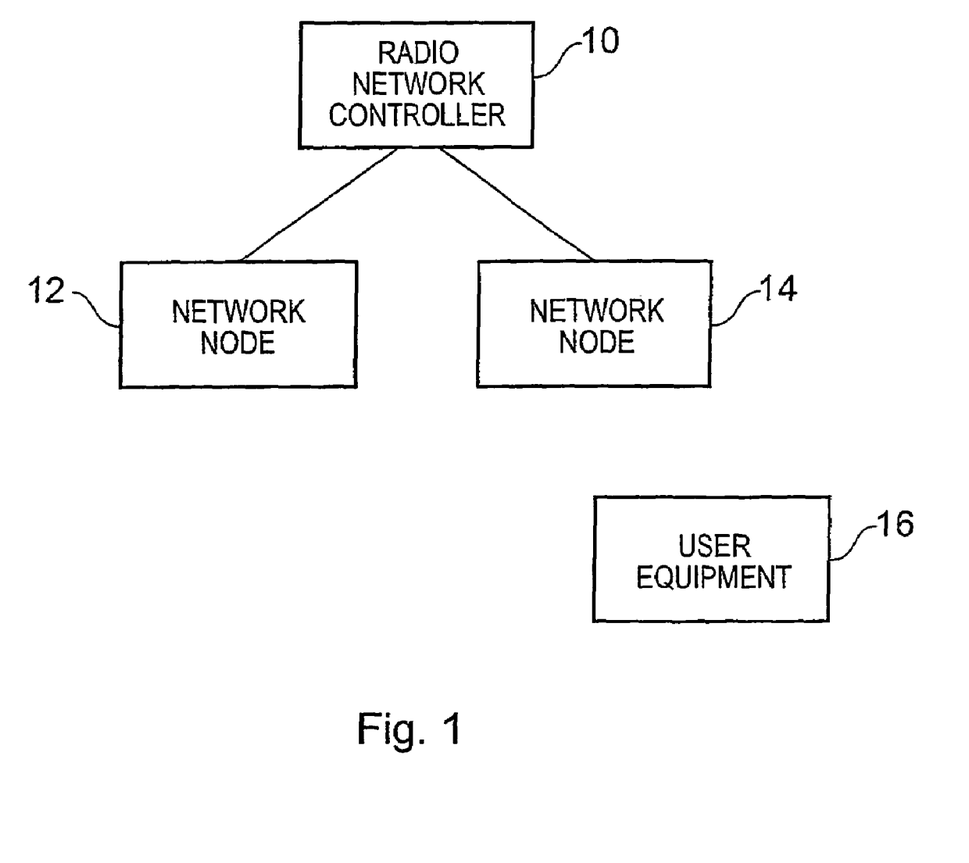
FIG. 1 is a schematic illustration of a part of a wireless communications network in accordance with the present invention.

FIG. 1 shows a small part of a radio communications network operating in accordance with the present invention. Thus, FIG. 1 shows a radio network controller 10, which serves network nodes 12, 14 which are located in respective cells of the system. In the illustrated embodiment of the invention, the system is a digital wideband code division multiple access (WCDMA) wireless communications network, for example a UMTS network.

In particular, the network node includes an uplink signal power detector, which is based on peak detection in long-term delay power spectrum (LT-DPS) estimations, which for instance can be calculated with a matched filter.

FIG. 1 also shows a user equipment 16, which may for example be a mobile phone, or any other device which can establish a connection to the network.

The network nodes 12, 14 and user equipment 16, are generally conventional, in the sense that they comply with existing versions of the UMTS standards. They will therefore only be described further to the extent necessary for an understanding of the present invention. Features and functions of these devices which are not described herein will be apparent to the person skilled in the art.

As will be appreciated, packet data traffic is very bursty, in the sense that there are time intervals where large amounts of traffic need to be transmitted, and other time intervals where there is only a very low volume of traffic, or no traffic at all.

In order to allow data to be transmitted instantly, a link between the terminal and the network is maintained continuously, even when no user data actually needs to be transmitted. In order to minimize the power consumption of the terminal, channel type switching is used. In this case, low-volume traffic is transmitted and received on common channels, while high-volume traffic is transmitted on dedicated channels. The present invention relates to the resynchronization, which needs to be performed whenever transmission on a dedicated channel needs to be started again.

Figure 2:
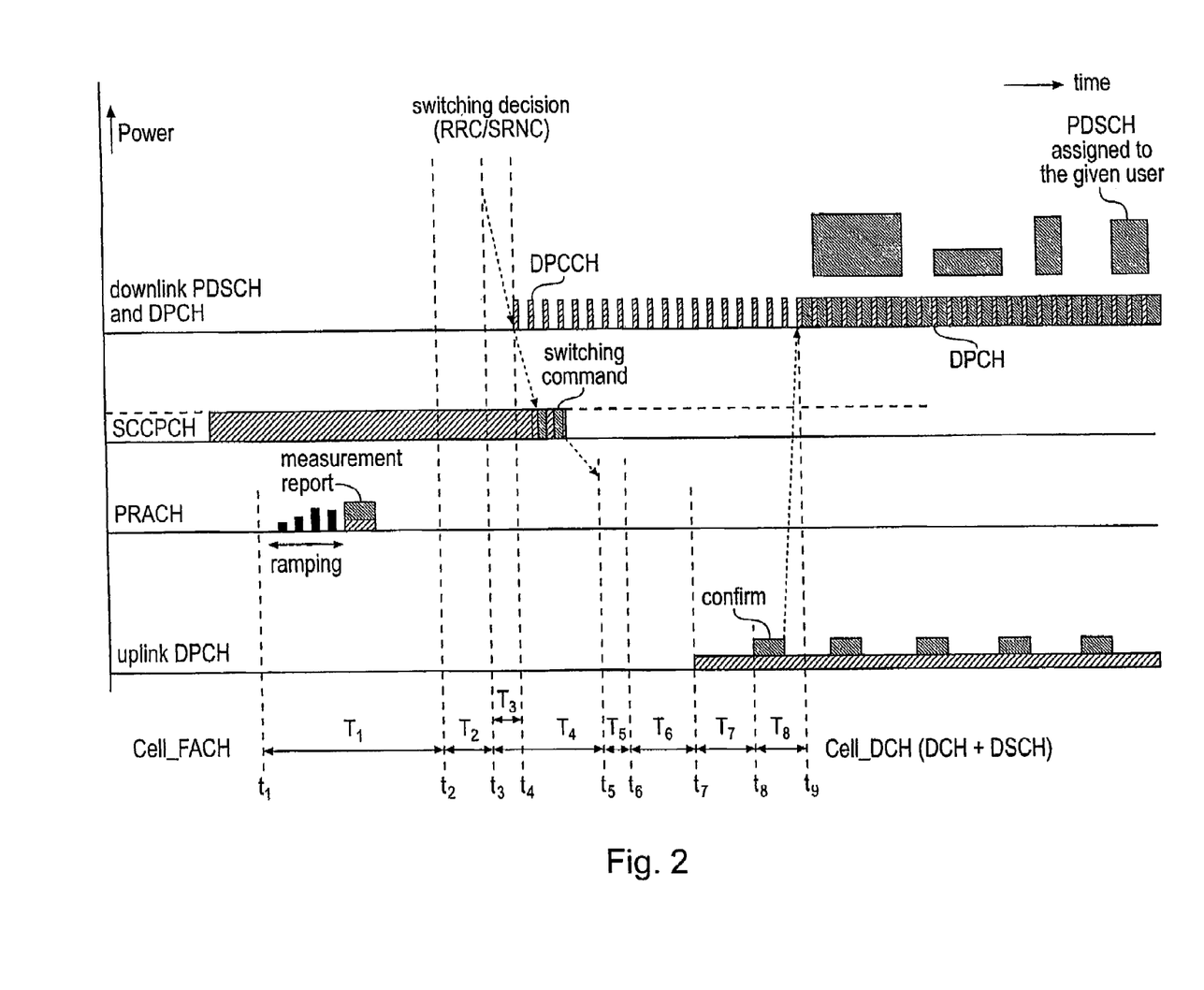
FIG. 2 shows the signals transmitted in a previously proposed channel switching procedure.

FIG. 2 shows a previously proposed technique for switching transmissions from a common channel to a dedicated channel.

Thus, FIG. 2 shows the signals which are transmitted on (a) the downlink physical downlink shared channel (PDSCH) and dedicated physical channel (DPCH), (b) the secondary common control physical channel (SCCPCH), (c) the physical random access channel (PRACH) and (d) the uplink dedicated physical channel (DPCH).

The scheme is also applicable when a high speed physical downlink shared channel (HS-PDSCH) is assigned instead of a DSCH, or when a dedicated physical channel (DPCH) is operated stand-alone (without associated shared channels).

This procedure is applied when the data volume, on the uplink and/or the downlink has become too high to be handled efficiently on a common channel. The decision to switch to a dedicated channel is taken in the RRC, taking into account traffic volumes measured in the network and measurements reported by the user equipment.

The switching decision is sent on the cell Forward Access Channel (FACH)/Secondary Common Control Physical Channel (SCCPCH), together with the assigned parameters of the dedicated physical channel. Receipt of the switching command triggers assignment of dedicated TRX resources in the network node, and the start of uplink monitoring on the assigned dedicated physical channel resources.

The meanings of the indicated time points $t_x$ and time intervals $T_x$ are listed below:— t1: uplink data available for transmission
t2: downlink data available for transmission
t3: channel switching decision
t4: physical layer reconfiguration in network node completed
t5: physical channel reconfiguration request received and processed in the UE
t6: UE physical layer reconfigured for downlink dedicated physical channel (DL DPCH) reception
t7: synchronization on DL DPCH and quality estimation completed, start of uplink dedicated physical control channel (UL DPCCH) transmission
t8: uplink synchronization on DPCCH completed in network node
t9: physical channel reconfiguration confirm message received and processed in serving Radio Network Controller (SRNC)
T1: time interval for traffic volume reporting
T2: processing of traffic volume information
T3: time for physical layer reconfiguration (Iub/Iur signaling) in the network
T4: transmission of physical channel reconfiguration request from SRNC to UE
T5: time for physical layer reconfiguration in the UE
T6: time required to synchronize to DL DPCH and obtain necessary quality information (40–140 ms to obtain in-sync)
T7: time required in network node to obtain synchronization to UL DPCCH and to stabilize power control loop (10–70 ms, depending on propagation conditions, availability of initial channel estimates from random access, searcher complexity)
T8: transmission of physical channel reconfiguration confirm message from UE to SRNC and processing From t3 onwards, the channelization codes to be used on the DL DPCH are occupied. Time t8 represents the earliest time at which the first uplink data should be sent, together with the confirm message. Time t9, after the confirm message has arrived and has been processed, is the time at which the first downlink data should be sent by the network on the downlink.

Thus between times t5 and t8 (in the uplink direction) and between times t5 and t9 (in the downlink direction), no data transmission is possible, either on the common channel or on the dedicated channel.

Figure 3:
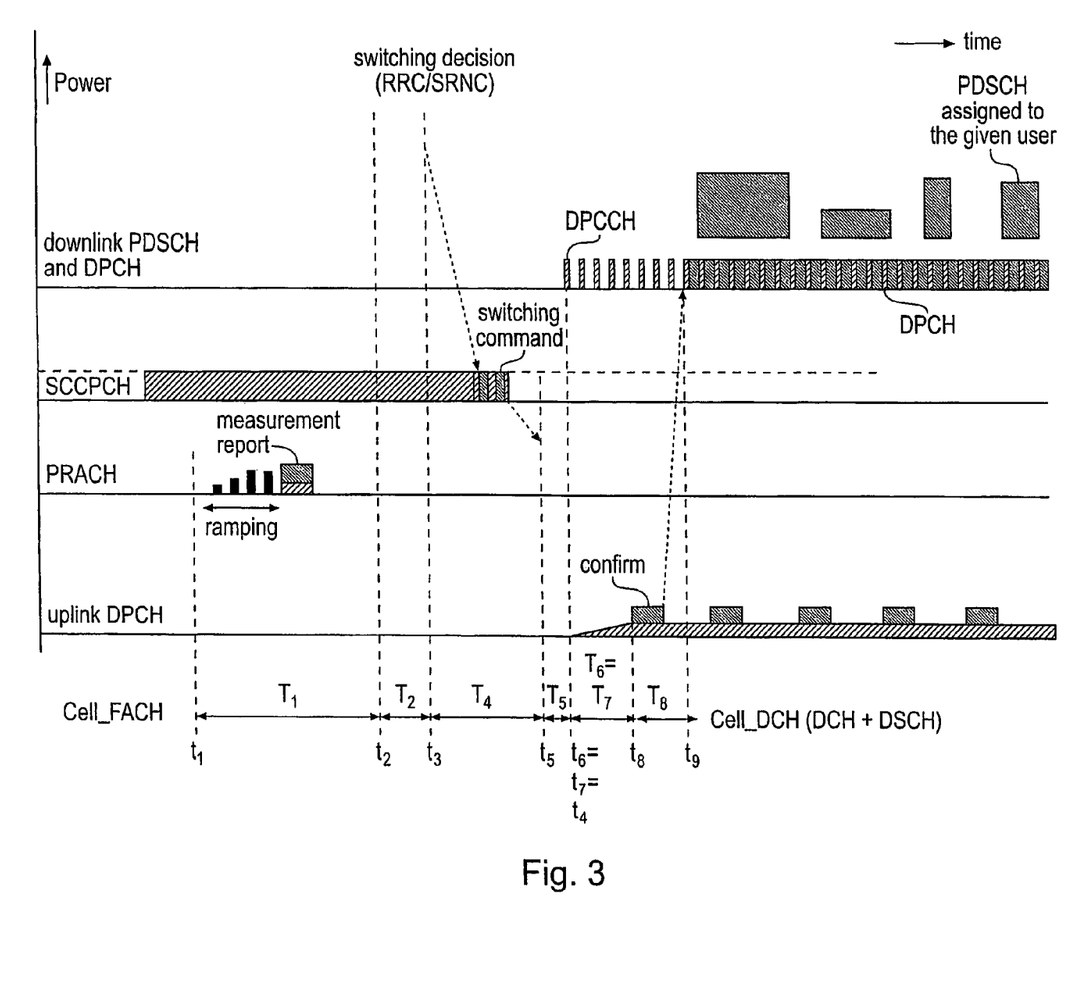
FIG. 3 shows the signals transmitted in a channel switching procedure according to the present invention.

FIG. 3 also shows the signals which are transmitted on (a) the downlink physical downlink shared channel (PDSCH) and dedicated physical channel (DPCH), (b) the secondary common control physical channel (SCCPCH), (c) the physical random access channel (PRACH) and (d) the uplink dedicated physical channel (DPCH), this time in a procedure in accordance with the present invention.

The procedure shown in FIG. 3 is similar to that shown in FIG. 2, except for the uplink/downlink synchronization, which is intended to take as little as 1 or 2 radio frames (10 or 20 milliseconds in this example).

The switching decision is received on the FACH/SCCPCH, while no uplink transmission is being performed. The last previous uplink transmission on the PRACH (e.g. a measurement report) was an arbitrary time previously, so there may not be any available information on previous uplink channel conditions.

The switching command provides the uplink and downlink channelization codes to the UE. After the switching command has been sent, a downlink DPCH is established by the network node at some initial power level, which is obtained with a standard open-loop power estimation scheme. When the switching command is received and processed by the UE, it begins transmission of an initial synchronization/power control preamble on the uplink using the assigned UL DPCCH scrambling code and the default channelization code. As will be described in more detail, the power of this preamble is ramped up during transmission.

When the network node has obtained synchronization, it begins power control of the user equipment, and the UE can determine from the transmit power control (TPC) bits received on the downlink DPCCH that it can start transmission on the DPDCH in the next radio frame. The first uplink transmission should be the switching (physical channel reconfiguration) confirm message on the DCCH.

This fast synchronization scheme is comparable with the one used for PRACH, and so the techniques required in the network node will generally be known to the person skilled in the art. In the initial synchronization phase the UE remains synchronized on the downlink based on CPICH reception.

Downlink data transmission could, but need not necessarily, be delayed until physical channel reconfiguration confirm is received, depending on performance of the synchronization scheme.

Figure 4:
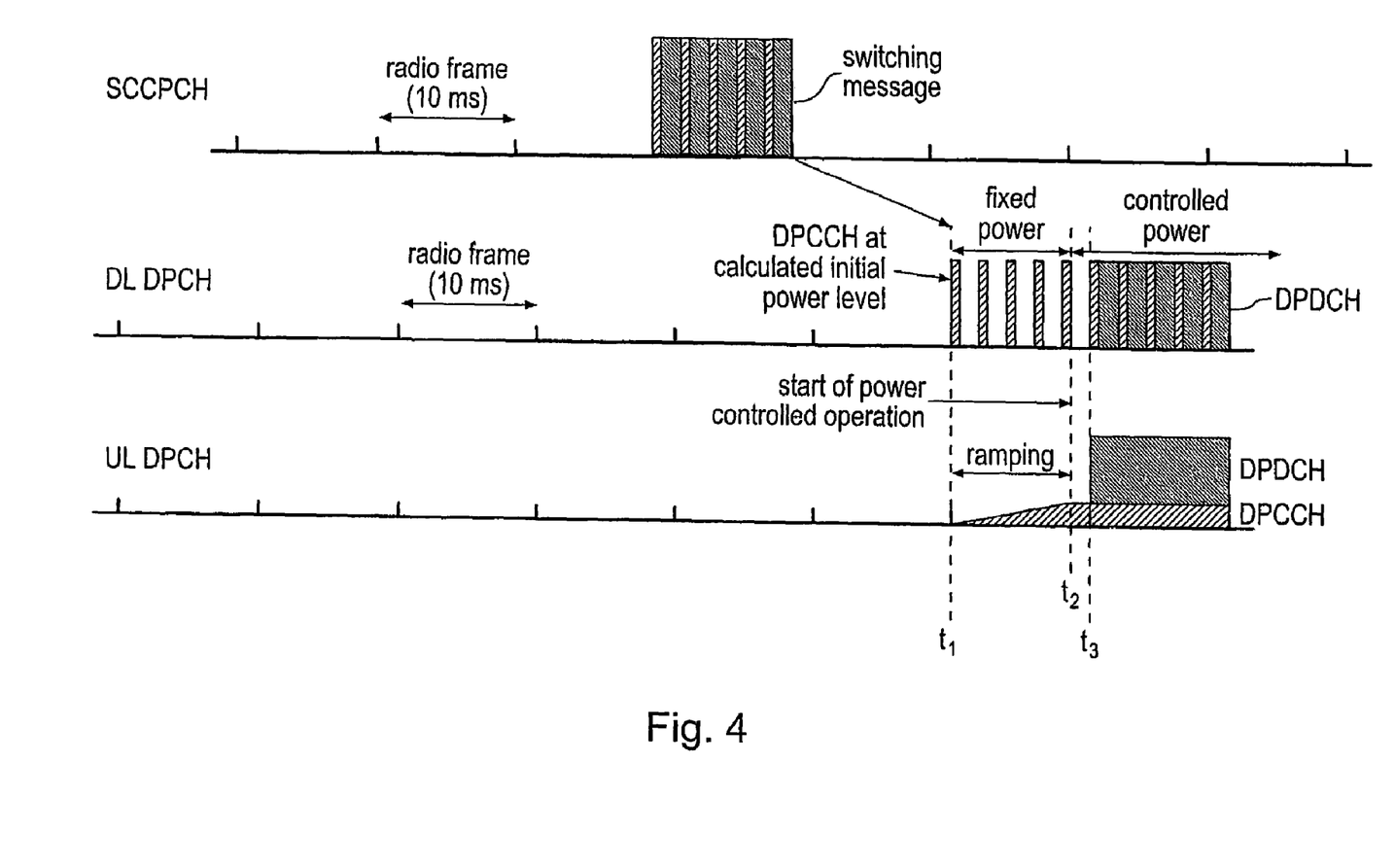
FIG. 4 shows in more detail a part of the procedure shown in FIG. 3.

FIG. 4 shows in more detail the signals transmitted during the synchronization phase of the procedure shown in FIG. 3, and also shows signals transmitted on the downlink dedicated physical channel (DL DPCH) during this time.

Downlink and uplink DPCH transmission should start at the same frame number, with this frame number being indicated in the switching message. For uplink ramping a predefined setting of all DPCCH bits could be used, making it possible in the UL receiver to collect all transmitted energy for initial synchronization without needing to be concerned with modulation. The UL DPCCH power is ramped up with one step per slot, over the course of one frame. In alternative embodiments of the invention, other time periods, preferably integer multiple of the frame period, could be specified for this power ramping preamble. The duration of the power ramping preamble could be configurable over the air interface.

In the ramping phase, the downlink transmit power control bits should indicate "power-up". As soon as the UL receiver has reliably synchronized to the uplink, from time instant $t_2$ in FIG. 4, it goes into power controlled mode, that is it transmits up/down power control commands and evaluates the TPC information which it receives on the UL DPCCH. In-sync detection could be tested in the network node in a way which is similar to that used for PRACH preambles, based on thresholds. The UE can detect in-sync either from the TPC pattern received on the downlink, or specially reserved bits within the DL DPCCH slot format may be used for this purpose during the resynchronization frame. The uplink power step size employed in the power controlled mode may be set to a different value than that used in the ramping phase.

Note that the UL receiver can collect the energy for the entire ramping phase, not only the energy of the last slot. Data of the previous and the present slot should be accumulated with a suitable weighting factor. This make the scheme much more efficient than the somewhat similar PRACH ramping procedure, in which only the energy of the preceding access slot can be captured due to the modulation with varying signatures. It should also be noted that the described UL DPCCH ramping is only feasible because it is performed with dedicated spreading codes. The PRACH ramping procedure in contrast employs common codes, which may be in use simultaneously by several users.

Figure 5:
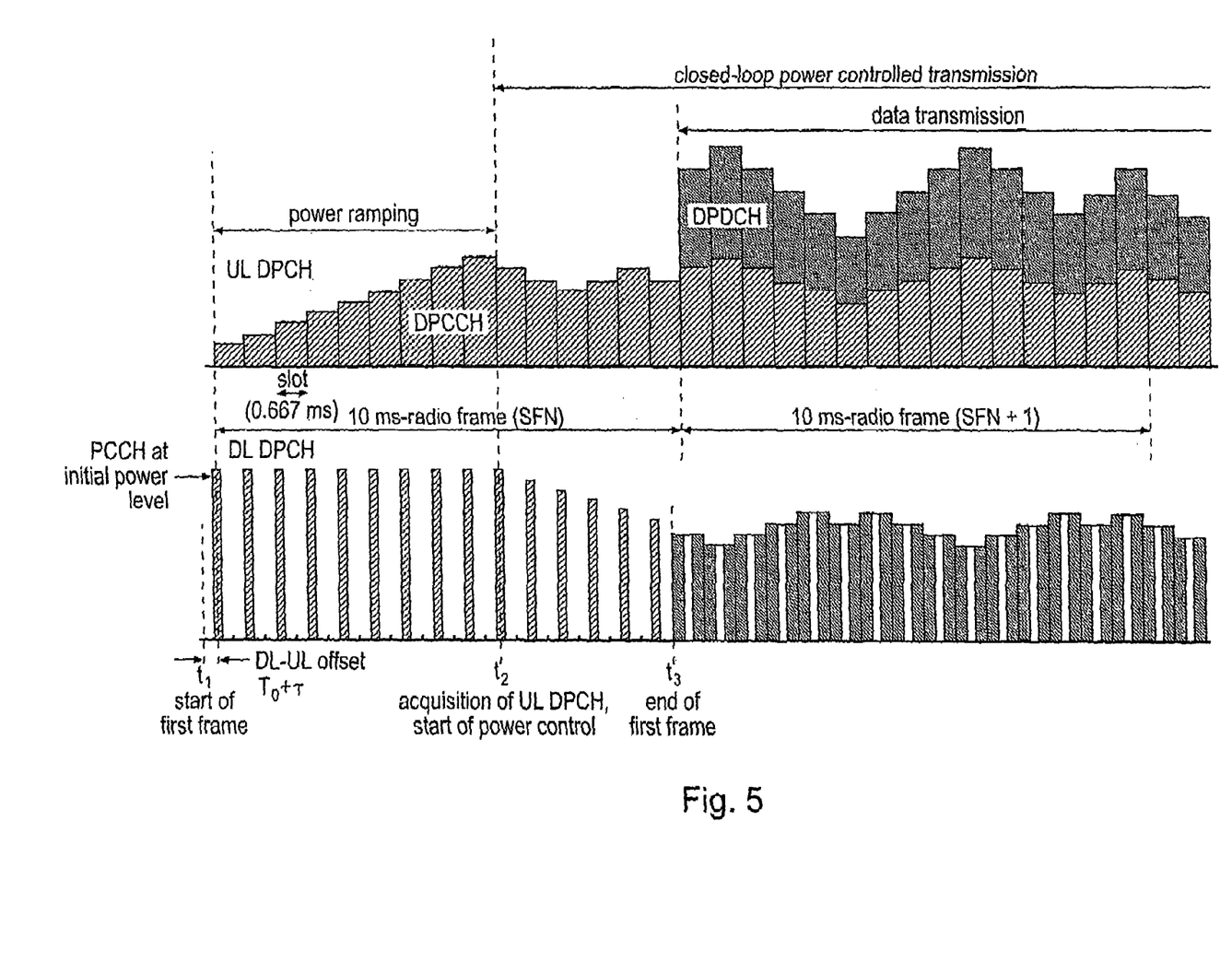
FIG. 5 shows in more detail a part of the procedure shown in FIG. 3.

FIG. 5 is a further diagram showing the procedure of the present invention in detail, and in particular showing the signals transmitted on the uplink dedicated physical channel (UL DPCH) and downlink dedicated physical channel (DL DPCH), starting at time $t_1$ shown in FIG. 4.

The initial downlink DPCCH power level can be set based on any available information regarding the distance of the UE from the network node or regarding the path loss. If no such information is available, a power level which is suitable for broadcast signals should be used. In either case, the power level is advantageously set to be somewhat higher than is absolutely necessary, in order that reception of the downlink DPCCH can be assured. A consequence of this is that, when power control of the downlink channel starts, it is probable that the power will reduce.

As shown in FIG. 5, data transmission can start on both the uplink and downlink DPDCH in the frame following the power control preamble. In order to achieve reasonable figures for both preamble detection performance and message block error rate, the DPCCH in the preamble phase could be ramped up to a higher power level than needed in the subsequent message transmission phase. In this case, an appropriate scaling of the DPCCH power should be applied at the transition between ramping and message transmission phases.

FIGS. 2–5 show the procedure used when switching from a common channel to a dedicated channel. When the data volumes on the uplink and the downlink of the dedicated channel have become so low that the data can more efficiently be transmitted on a common channel, a suitable switch is made.

FIGS. 2–5 show the procedure used when switching from a common channel to a dedicated channel in response to a high data rate on the downlink. A similar procedure can also be used when switching from a common channel to a dedicated channel in response to a high data rate on the uplink, although this situation may be less common.

The procedures described above with reference to FIGS. 2–5 relate to the channel switching technique discussed previously. As also discussed previously, transmission on the dedicated physical channel (DPCCH) can be discontinuous. That is, transmissions may be made continuously during time periods when data traffic volumes are high. However, when there is no data traffic, transmissions can be suspended for a number of consecutive radio frames. In order for this to be successful, resynchronization must be performed quickly and efficiently.

Figure 6:
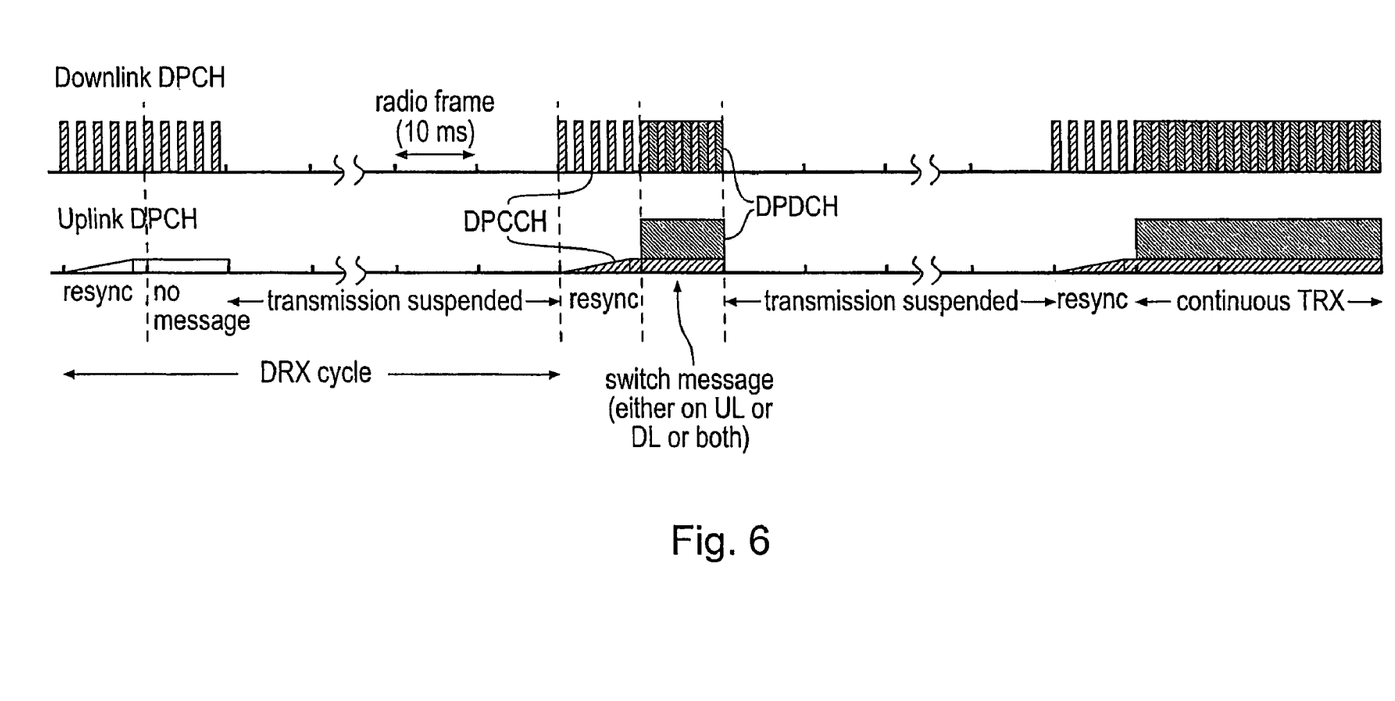
FIG. 6 shows the signals transmitted in a further method according to the present invention.

FIG. 6 shows the discontinuous DPCCH transmission scheme. In this mode, at predefined time instants, identified by the frame number, the transmitter and the receiver in both the UE and the network node are activated, in order to check if one of the two sides sends a control message indicating that the discontinuous DPCCH transmission mode should be stopped.

FIG. 6 shows a sequence in which the system undergoes a transition from discontinuous to continuous transmission mode.

In the initial discontinuous transmission mode, the UE and network TRX wake up at predefined points in time, perform a resynchronization, and check if there is any message transmitted on either link. For example, such messages could be switching requests, that is, requests to leave the discontinuous mode after the next resynchronization.

On the uplink, measurement reports could also be sent at these times.

It is assumed that a transition from the discontinuous mode to the continuous mode is not possible immediately subsequent to a switching request, because of the time required for message processing, and because of the possible need for reconfigurations in the network.

The resynchronization procedure shown in FIG. 6 is generally the same as that shown in FIGS. 2–5, and described with reference thereto. One difference compared to the previously described procedure is that, in the present case, resynchronization is not triggered by a message sent to the UE, but occurs at a predefined time.

The time between successive resynchronizations is defined as a DRX cycle. The choice of the DRX cycle could be adapted to the propagation scenario individually for each UE and also be made dependent on UE capability to resynchronize within a given time interval (e.g. 10 ms).

A longer DRX cycle allows a larger power saving, compared with continuous transmission. However, if the DRX cycle is not too long, channel path delay tracking is still possible, which could reduce the necessary complexity of the resynchronization detector. For low mobility scenarios, tracking is even possible for very long DRX cycles, such as several hundreds of ms or even several seconds.

Switching messages can be sent by way of L3 based signaling, originating in the SRNC, which would allow resynchronization to multiple cells in the case of macrodiversity. Alternatively, L1 based signaling can be used in the case of single cell operation.

There is therefore disclosed a method of resynchronization, and associated methods of network operation, which can be performed using relatively low power in a user terminal, and without requiring high terminal complexity.

The invention claimed is:

1. A method of operating a wireless communication network, in which a communications device communicates with the network, the method comprising:
    establishing a first common channel and a second dedicated channel for communication between a communications device and a wireless network, the second channel comprising a dedicated uplink channel and a dedicated downlink channel, wherein an initial power level for the dedicated downlink channel is set higher than is necessary; and in order to switch transmissions from the first common channel to the second dedicated channel;

transmitting a preamble signal from the communications device to the network on said dedicated uplink channel, wherein the preamble signal increases in power during transmission;

in the network, attempting to detect the transmitted preamble signal on said dedicated uplink channel; and in response to successful detection of the transmitted preamble signal, establishing a connection on said second dedicated channel.

2. A method as claimed in claim 1, comprising switching transmissions from the first common channel to the second dedicated channel in response to a traffic volume on the common channel.

3. A method as claimed in claim 2, comprising switching transmissions from the first common channel to the second dedicated channel in response to a traffic volume on an uplink of the common channel.

4. A method as claimed in claim 2 comprising switching transmissions from the first common channel to the second dedicated channel in response to a traffic volume on a downlink of the common channel.

5. A method as claimed in claim 1, further comprising, after establishing a connection on said second dedicated channel, switching transmissions from the second dedicated channel to the first common channel in response to a traffic volume on the dedicated channel.

6. A method as claimed in claim 1, further comprising, while transmitting the preamble signal on the dedicated uplink channel, transmitting a signal on the dedicated downlink channel at a constant power.

7. A method as claimed in claim 1, further comprising, in response to successful detection of the transmitted preamble signal, estabHshing a power controlled connection on the dedicated uplink channel and the dedicated down link channel of said second dedicated channel.

8. A method of operating a wireless communication network, in which a communications device communicates with the network, the method comprising:

establishing a dedicated channel for communications between a communications device and a wireless network, wherein, in a first mode, data is transmitted continuously on said channel, and, in a second mode, transmission on said channel is discontinuous, and wherein, in said second mode, the method comprises:

transmitting a resynchronization signal at a predefined time from the communications device to the network on said channel, wherein the resynchronization signal increases in power during transmission;

in the network, attempting to detect the transmitted resynchronization signal on said channel; and after resynchronization of said dedicated channel, determining whether return to said first mode.

9. A method as claimed in claim 8, further comprising, in said second mode, defining a future time frame for transmitting said resynchronization.

10. A method as claimed in claim 8, wherein the wireless communication network is a CDMA network, and the dedicated channel is defined by specific codes.

* * * * *

UNITED STATES PATENT AND TRADEMARK OFFICE
CERTIFICATE OF CORRECTION

| | |
|---|---|
| PATENT NO. | : 7,212,823 B2 |
| APPLICATION NO. | : 10/496074 |
| DATED | : May 1, 2007 |
| INVENTOR(S) | : Granzow et al. |

Page 1 of 1

It is certified that error appears in the above-identified patent and that said Letters Patent is hereby corrected as shown below:

Col. 10, line 5, claim 7, delete "estabHshing" and insert -- establishing --, therefore.

Signed and Sealed this

Seventeenth Day of June, 2008

JON W. DUDAS
*Director of the United States Patent and Trademark Office*